(12) United States Patent
Matich et al.

(10) Patent No.: US 6,628,228 B1
(45) Date of Patent: Sep. 30, 2003

(54) RANGING SYSTEM BEAM STEERING

(75) Inventors: George Edward Matich, Basildon (GB); David Henry Ramsey, Pitsea (GB); Raymond John Walls, Chelmsford (GB)

(73) Assignee: Bae Systems Electronics Limited, Farnborough (GB)

(*) Notice: Subject to any disclaimer, the term of this patent is extended or adjusted under 35 U.S.C. 154(b) by 0 days.

(21) Appl. No.: 07/578,518

(22) Filed: Aug. 16, 1990

(51) Int. Cl.[7] .......................... G01S 13/00; G01S 13/08
(52) U.S. Cl. .......................................... 342/75; 342/120
(58) Field of Search ........................... 342/75, 76, 120, 342/122, 77

(56) References Cited

U.S. PATENT DOCUMENTS

| | | | | |
|---|---|---|---|---|
| 3,127,604 A | * | 3/1964 | Herriott | 342/75 |
| 3,328,795 A | * | 6/1967 | Hallmark | 342/75 |
| 4,078,234 A | * | 3/1978 | Fishbein et al. | 342/145 X |
| 4,758,839 A | | 7/1988 | Goebel et al. | |

FOREIGN PATENT DOCUMENTS

| | | |
|---|---|---|
| EP | 0 238 306 | 9/1987 |
| GB | 1 294 851 | 11/1972 |
| GB | 1 375 221 | 11/1974 |

* cited by examiner

Primary Examiner—Mark Hellner
(74) Attorney, Agent, or Firm—Crowell & Moring LLP

(57) ABSTRACT

An aircraft radar and altimeter system, comprising a radio transmitter and a transmitting antenna for radiating a beam of radio energy, a radio receiver and receiving antenna for receiving radio energy reflected from the ground, processing means for comparing the signal received by the receiver with the signal transmitted by the transmitter and determined from the comparison the instantaneous altitude of the aircraft above the ground, and means for changing the direction of radiation of the beam relative to the aircraft to compensate for changes in the attitude of the aircraft relative to the horizontal about at least one of the fore and aft and side-to-side axes.

9 Claims, 3 Drawing Sheets

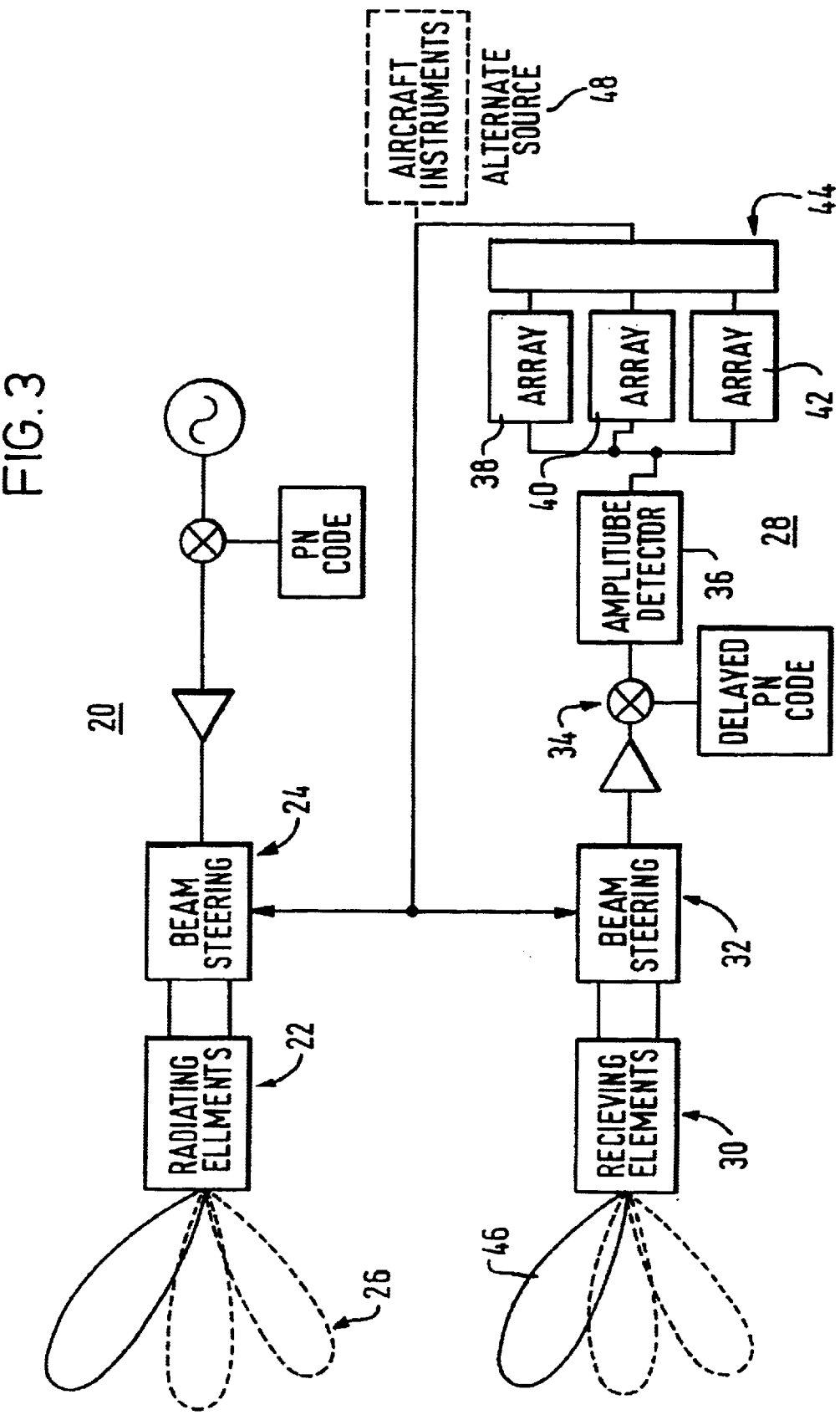

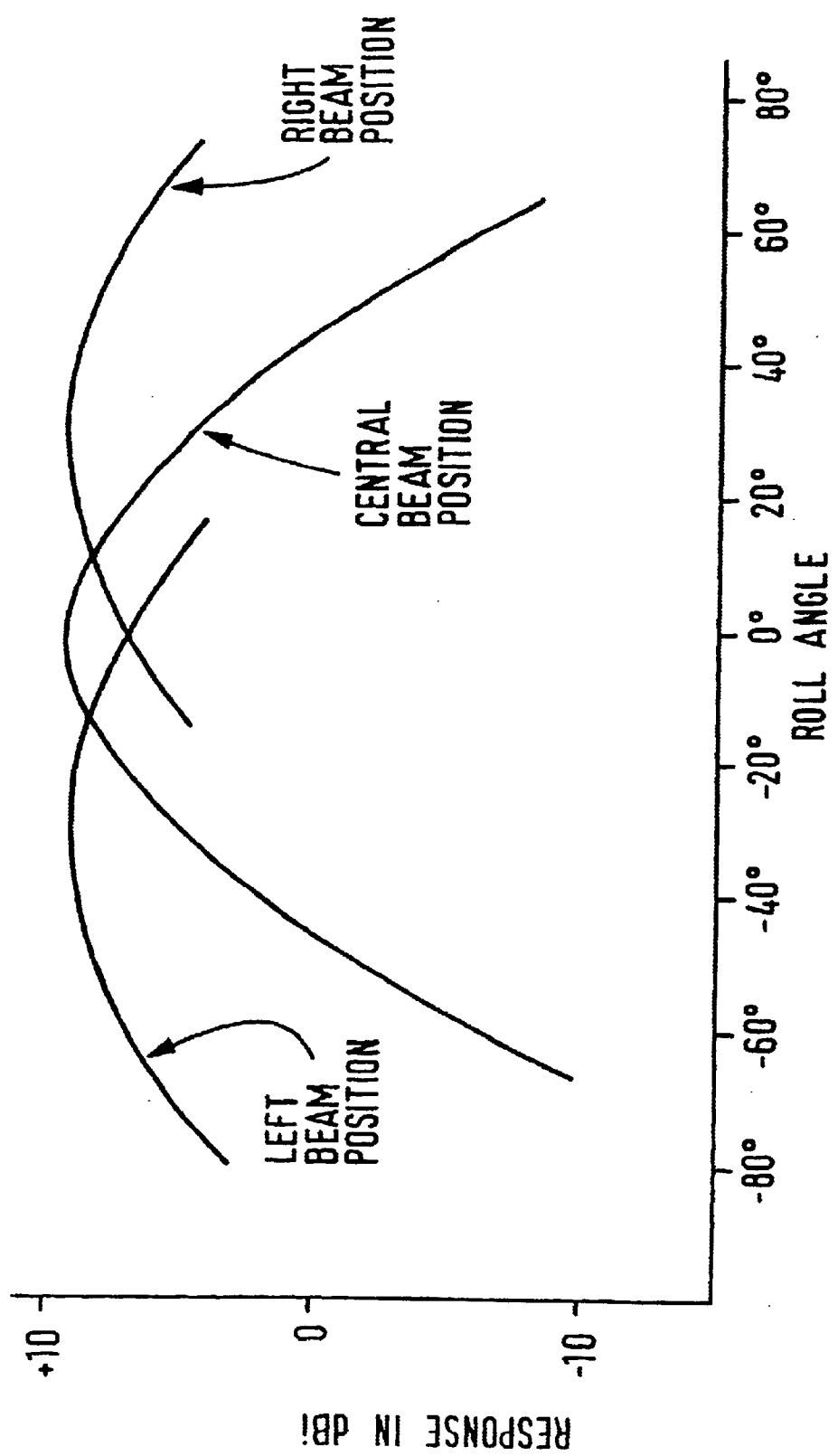

RANGING SYSTEM BEAM STEERING

BACKGROUND OF THE INVENTION

This invention relates to a continuous wave ranging system and, in one aspect, to an aircraft radar altimeter system.

Such systems usually comprise a means of microwave transmission upon which some form of coding has been added, and antenna for directing the energy to the target, an antenna for receiving the returned energy and, after amplification, a means of determining the amount of delay that has occurred on the signal, and hence the range of the target. The coding on the transmission had in the past been pulse or frequency modulation, but more recently phase modulation from a pseudo-random code has been used. This form of modulation has the property of producing a noise-like transmitted spectrum which is difficult to detect and hence finds applications where covertness is of importance. Covertness can be enhanced by reducing the transmitted power such that the returned signal is just sufficient for ranging measurement.

In such phase-modulated systems, the received signal is correlated with a delayed version of the transmitted code, the delay being gradually increased in steps, and samples of the output of the correlator are detected and stored in an array. From this stored data, the delay, and hence the range, where the received signal return occurs can be found.

A typical system is shown in FIG. 1 and comprises:- a transmitter including an r.f. signal generator 1; a modulator 2 for modulating the r.f. signal in accordance with a pseudo-random code 3; a transmitter amplifier 4 and a transmitting antenna 5. The receiver includes a receiving antenna 6; a receiver amplifier 7; a correlator 8 for correlating the received signal with a delayed version of the transmitted code corresponding to the range being examined; an amplitude detector 10, and a memory array 11.

The data for such a system is shown in FIG. 2, the code delay corresponding to range.

The pseudo random code used in the invention is preferably a maximal length code, a sequence of numbers generated by a shift register with certain feedbacks on it. For the system of the present invention, a code length of 2047 digits is preferred.

Conventional radio altimeters rely on the beam width of the transmitting and receiving antennas to operate with a pitch and roll performance of up to +/−60°. In achieving this attitude performance, the antenna bore sight gain needs to be sacrificed. Existing methods used to overcome this gain shortfall are to increase transmitter output power and/or increase receiver sensitivity. Increasing the transmitter output power results in a more detectible transmission within an ECM environment, while receiver sensitivity is limited by available low noise high frequency amplifier technology, and by thermal noise. An alternative technique to achieve the required altitude performance is to narrow the transmit and receive antenna beam widths and steer the beams.

SUMMARY OF THE INVENTION

Accordingly, the invention provides an aircraft radar altimeter system, comprising a radio transmitter and a transmitting antenna for radiating a beam of radio energy, a radio receiver and receiving antenna for receiving radio energy reflected from the ground, processing means for comparing the signal received by the receiver with the signal transmitted by the transmitter and for determining, from the comparison, the instantaneous altitude of the aircraft above the ground, and means for changing the direction of radiation of said beam relative to the aircraft to compensate for changes in the attitude of the aircraft relative to the horizontal about at least one of the fore and aft and side-to-side axes.

In one embodiment, the means for changing the direction of the beam may be arranged to move the direction of the beam periodically across at least part of the maximum range of movement and then to select the beam direction from which the strongest signal is detected by the receiver. The beam direction may be switched for a given one of the axes between a centre direction and a direction at a predetermined angle on each side of the centre direction. Alternatively, the beam direction may be steered continuously or in a plurality of small steps.

It is preferred that means are provided for changing the direction of the receiving antenna beam. These means are typically arranged such that the change in direction of the receiving antenna beam corresponds to the change in direction of radiation of the transmitted beam. The receiving antenna can be used to measure the amplitude of the return signals and store the values in an array for further processing.

The means for changing the direction of the beam may alternatively be arranged to change the direction of the beam in accordance with data indicating the attitude of the aircraft. Such data may be supplied from the aircraft's instruments and can be independent of data in the system so simplifying system interface.

The aircraft attitude data required for beam steering may be taken from a multiplexed bus forming part of a total avionics environment. Beam steering information can be transmitted to antenna phase shifters, for example, by superimposing a DC control voltage on the r.f. antenna feeder cable. High antenna reliability can be maintained, since solid state devices would be used to perform the beam steering function within the antenna assembly. Using beam steering allows the instantaneous beamwidth to be reduced with a proportional increase in bore sight gain.

For a given attitude performance, the use of this technique results in a less detectible system, a more jam resistant system, since the narrower beam width presents a smaller window to any interference source, and reduced susceptibility to tracking false short range signals which are not directly below the aircraft (for example valley walls). The amount of the reduction in this phenomenon would be determined as a function of the reduction of beam width relative to the slope of the valley walls.

BRIEF DESCRIPTION OF THE DRAWINGS

Reference is made to the accompanying drawings in which:

FIG. 3 is a schematic view of one embodiment of the present invention; and

FIG. 4 is a graph illustrating the effect of switching the beam direction in a radar altimeter system according to the invention it being noted that beam switching results in a 30° movement of the roll axis polar diagram bore sight.

DETAILED DESCRIPTION OF THE PREFERRED EMBODIMENT

Figure 1:
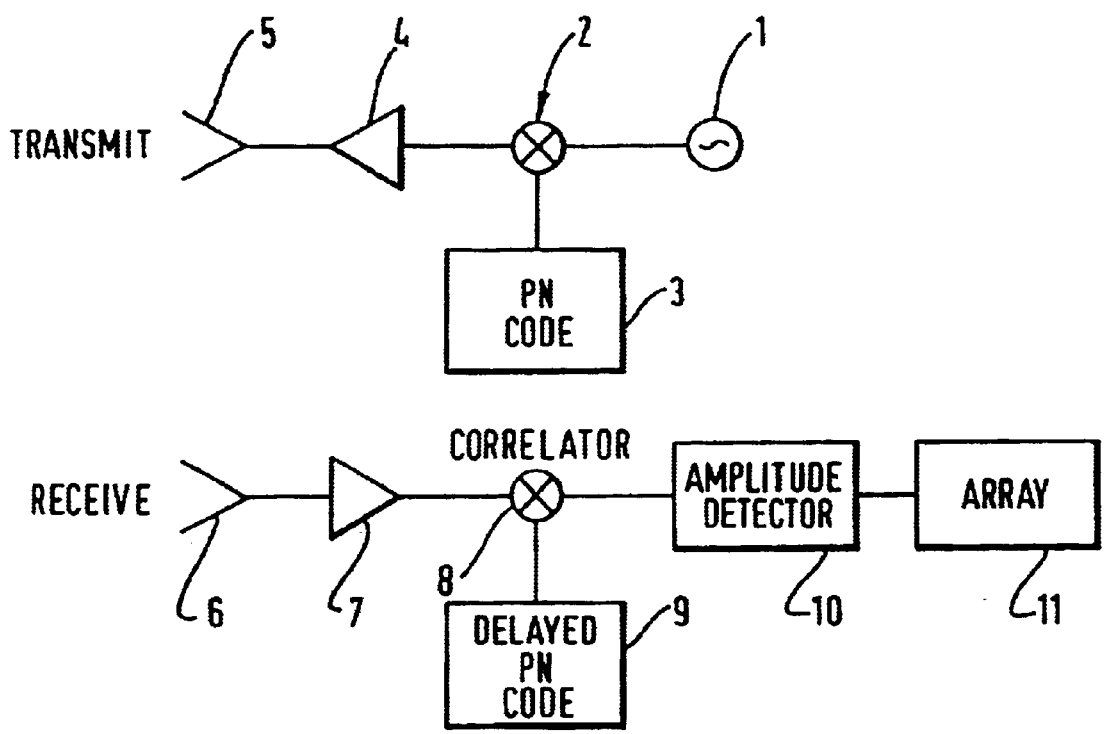
FIG. 1 is a schematic diagram of an aircraft radar and altimeter system according to the prior art.
Figure 2:
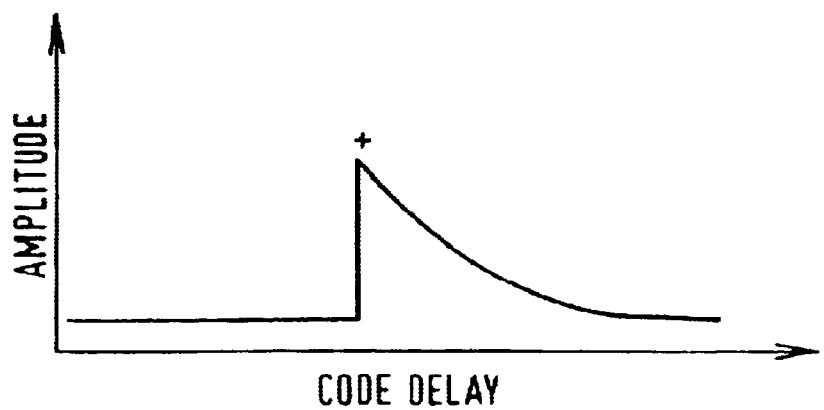
FIG. 2 is a curve showing the data for the system of FIG. 1.

The system shown in the drawings comprises a transmitter 20 for generating a pseudo-random code pattern to be emitted by radiating elements 22. The elements 22 are under the control of a beam steering arrangement 24 which allows the direction of radiation of the beam 26 to be changed. The receiver 28 includes receiving elements 30 under the control of a further beam steering arrangement 32. The received signals are compared with a delayed version of the pseudo-random code in a comparator 34 and the results fed to an amplitude detector 36 and then into arrays 38, 40, 42 and a processor 44.

In use, the beam steering arrangement 24 and the further beam steering arrangement 32 are linked such that the transmitter beam 26 and the receiver beam 46 are projected in the same direction. The desired direction of projection of the beams 26, 46 can be determined by examining the results in the arrays 38, 40, 42 when the beams 26, 46 are scanned from one extreme to the other, the strongest signal indicating the preferred direction which can be fed to the beam steering arrangements 24, 32. A scan can be made on a regular basis to take into account changes in aircraft attitude. Alternatively, the beam steering arrangements 24, 32 can be linked to the aircraft instruments 48 which can be used to determine the attitude of the aircraft and hence the appropriate beam direction.

What is claimed is:

1. An aircraft radar and altimeter system, comprising: a radio transmitter and a transmitting antenna for radiating a beam of radio energy; a radio receiver and receiving antenna for receiving radio energy reflected from the ground; processing means for comparing a signal received by said receiver with said signal as transmitted by said transmitter and for determining, from said comparison, the instantaneous altitude of said aircraft above the ground; and means for changing the direction of radiation of said beam relative to said aircraft to compensate for changes in attitude of said aircraft relative to horizontal about at least the fore and aft axis.

2. An aircraft radar and altimeter system comprising a radio transmitter and a transmitting antenna for radiating a beam of radio energy; a radio receiver and receiving antenna for receiving radio energy reflected from the ground; processing means for comparing a signal received by said receiver with said signal as transmitted by said transmitter and for determining, from said comparison, the instantaneous altitude of said aircraft above the ground; and means for changing the direction of radiation of said beam relative to said aircraft to compensate for changes in attitude of said aircraft relative to horizontal about at least one of the fore and aft and side-to-side axes, wherein said means for changing the direction of the beam move the direction of said beam periodically across at least part of a maximum range of movement and then select a beam direction for which a strongest signal is detected by said receiver.

3. A system according to claim 2, wherein said means for changing the direction of said beam switch said beam direction for a given one of said axes between a centre direction and direction at a predetermined angle on each side of said centre direction.

4. A system according to claim 2, wherein said means for changing said direction of said beam steer said beam direction continuously.

5. A system according to claim 2, wherein said means for changing said direction of said beam steer said beam direction in a series of small steps.

6. An aircraft radar and altimeter system comprising a radio transmitter and a transmitting antenna for radiating a beam of radio energy; a radio receiver and receiving antenna for receiving radio energy reflected from the ground; processing means for comparing a signal received by said receiver with said signal as transmitted by said transmitter and for determining, from said comparison, the instantaneous altitude of said aircraft above the ground; and means for changing the direction of radiation of said beam relative to said aircraft to compensate for changes in attitude of said aircraft relative to horizontal about at least one of the fore and aft and side-to-side axes, wherein said means for changing the direction of said beam change the direction of said beam in accordance with data indicating the attitude of said aircraft.

7. A system according to claim 6, wherein said attitude data are supplied from instruments in said aircraft.

8. A system as claimed in claim 1 wherein the direction of a receiver antenna beam can also be changed.

9. A system as claimed in claim 8 wherein said receiver antenna beam and said transmitter antenna beam both have the same direction.

* * * * *